July 11, 1933.  A. G. F. WALLGREN ET AL  1,917,277
BEARING
Filed April 23, 1930   2 Sheets-Sheet 2

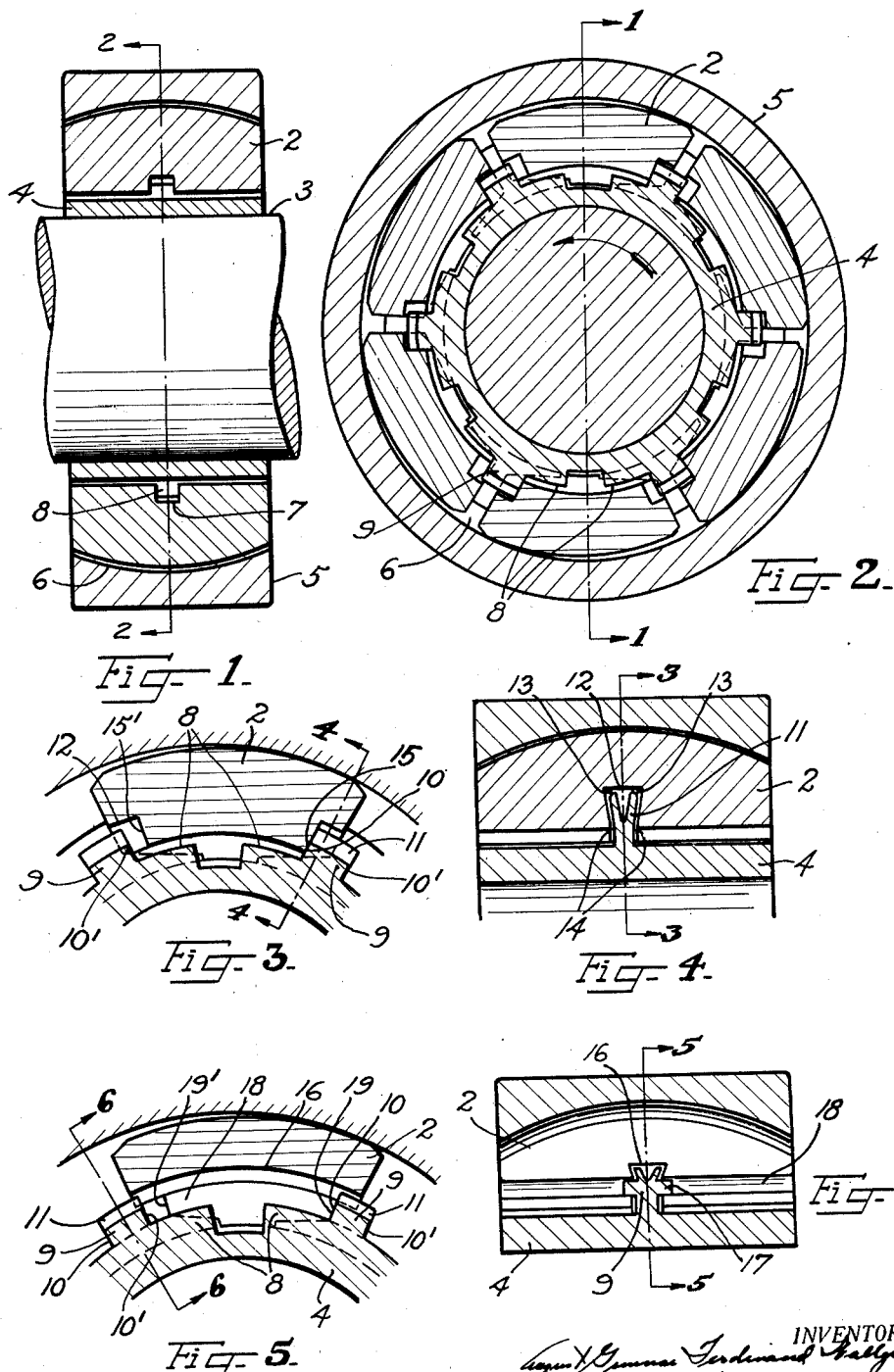

Patented July 11, 1933

1,917,277

UNITED STATES PATENT OFFICE

AUGUST GUNNAR FERDINAND WALLGREN AND CARL GUSTAF JANSON, OF STOCKHOLM, SWEDEN, ASSIGNORS TO AKTIEBOLAGET NOMY, OF STOCKHOLM, SWEDEN, A CORPORATION OF SWEDEN

BEARING

Application filed April 23, 1930, Serial No. 446,469, and in Sweden May 3, 1929.

The present invention relates to bearings and more particularly to sliding block bearings.

In accordance with the invention, we provide means for limiting free movement of the blocks radially outward from a cooperating member.

In a radial bearing having a rotating inner ring and stationary outer ring, the invention preferably takes the form of resilient parts projecting from the inner ring into undercut recesses or grooves in the bearing blocks and engageable with the sides of the recesses or grooves to limit free radial movement of the blocks outwardly from the inner ring.

Several embodiments are illustrated in the accompanying drawings forming a part of this specification.

In the drawings, Fig. 1 is a longitudinal section through one form of bearing embodying the invention;

Fig. 2 is a cross section taken on the line 2—2 of Fig. 1;

Fig. 3 is a section on an enlarged scale of a part of the bearing illustrated in Fig. 2;

Fig. 4 is a section taken on the line 4—4 of Fig. 3;

Fig. 5 is a section similar to Fig. 3 and showing another form of the invention;

Fig. 6 is a section taken on the line 6—6 of Fig. 5;

Figure 7:
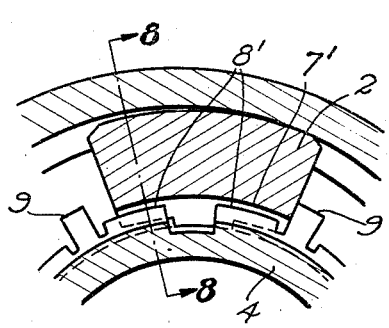
Fig. 7 is a section similar to Fig. 3 and showing still another form of the invention.

Referring now to Figs. 1 to 4, reference character 2 designates the bearing blocks which rotate with shaft 3, upon which is mounted the inner bearing member or ring 4. One of the major faces of each of the blocks 2 provides a spherically curved outer bearing surface which slides with respect to the inner spherically curved bearing surface 6 of the outer bearing member or race 5. Liquid films are formed between the blocks and the race for sustaining the load on the bearing. Blocks 2 are eccentrically supported so that upon rotational movement of the inner bearing member 4, for example, in the direction of the arrow shown in Fig. 2, they assume a tilted position tending to form a sustaining liquid film of wedge like form between their outer bearing surfaces and the surface 6 of the outer race. Upon reversal of the direction of rotation of member 4 the support of each block shifts so that the blocks assume a tilted position opposite that shown in Figs. 2 and 3. This tilting of the blocks is permitted by supporting means comprising grooves and supporting projections the specific form of which is not a part of the present invention, and which may, for example, be of the form disclosed in the copending application of August Gunnar Wallgren, Serial No. 277,769, filed May 14, 1928, Pat. No. 1,871,485 granted August 16, 1932.

Blocks 2 are guided axially by means of peripheral grooves 7 in the blocks which receive the complementary peripheral projections 8 on the bearing ring 4. At spaced intervals the projections 8 are provided with radially extending lugs 9 forming abutments 10 and 10' for limiting the circumferential movement of the blocks with respect to the inner bearing ring 4. The outer ends of lugs 9 are peripherally bifurcated to form radially extending tongues 11 which, as shown in Fig. 4, are spread or flared axially.

Blocks 2 are circumferentially longer than the distance between adjacent abutments 10 and 10' of different adjacent lugs 9 and are provided on their major faces opposite the faces providing the sliding surfaces with circumferential recesses 12 adapted to receive the tongues 11. As illustrated in Fig. 4 the recesses 12 are undercut, the side walls thereof forming retaining surfaces adapted to engage the tongues 11 to limit free radial movement of the blocks outwardly from the inner ring 4. Tongues 11 are made axially resilient so that the blocks 2 can be forced into position radially over the tongues between the abutments 10 and 10'. In order to facilitate the entry of the tongues into the recesses they are beveled as at 13 and the edges of the recesses 12 are beveled as at 14.

The abutments 15 and 15' formed by the inner walls of the recesses 12 co-act with the abutments 10 and 10' to limit rotational movement of the blocks 2 relative to bearing ring 4, and are preferably arranged so that they bear mainly against the parts of the abutments 10 and 10' formed by the solid or undivided portions of the lugs 9.

In the form shown in Figs. 1 to 4, the recesses 12 are relatively difficult to manufacture, and in the form shown in Figs. 5 and 6, this difficulty is overcome by making the tongue-receiving recesses in the blocks in the form of an undercut or dovetail groove extending circumferentially from end to end of the blocks. The general form and arrangement of the tongues 11 is the same in this embodiment as has been previously described. The lugs 9, however, are axially extended as at 17 to form abutments 10 and 10' cooperating with abutments 19 and 19' formed by the axial projections 18 on the blocks. The cooperating abutments 10 and 19 and 10' and 19' serve to limit the peripheral movement of the blocks relative to ring 4 in the same manner as the abutments 10 and 15 in the form shown in Fig. 3. In the present form, however, the abutments must extend axially to either side of the grooves 16, since abutments of the form shown in Fig. 3 would slide through the grooves 16 if an attempt were made to employ them with the grooved blocks of Figs. 5 and 6.

From the above description of the different embodiments, it will be seen that, if desired, the tongues 11 may be relied upon to afford axial guidance for the blocks, in which event the projections 8 and grooves 7 may be omitted.

Figure 8:
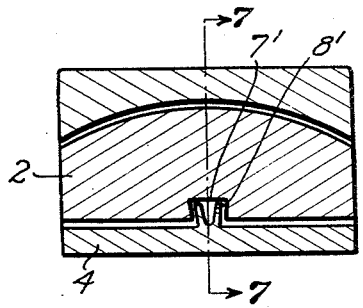
Fig. 8 is a section taken on the line 8—8 of Fig. 7.

In Figs. 7 and 8, a further form of the invention is illustrated in which projections 8 of the inner bearing member are bifurcated to form tongues 8' which are received in undercut or dovetail grooves 7' to limit radial movement or separation of the blocks from ring 4 in the same manner as such play is limited by the tongues 11 and grooves 16 in Fig. 5. In this embodiment peripheral movement of the blocks is limited by means of the lugs 9 which extend radially beyond the bottoms of grooves 7'.

It will be seen that in the forms shown in Figs. 5 and 7 the grooves in the blocks may be formed by a simple turning operation and in all of the forms shown thus far tongues 11 may also be formed by a turning operation. In the case of the form shown in Fig. 7 the lugs 9 are also peripherally bifurcated if it is desired to simplify manufacturing by forming tongues 8' through a turning operation.

In the manufacture of the device, the tongues 11 and 8' may be turned to the form shown in the figures, or they may be formed by first bifurcating the projections and then spreading the tongues to the form shown in the figures.

Figure 9:
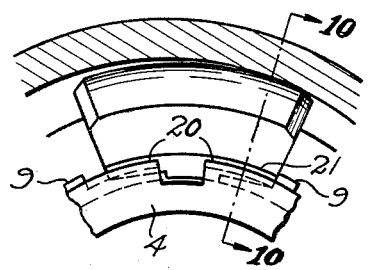
Fig. 9 is a section similar to Fig. 3, showing a fourth form of the invention.
Figure 10:
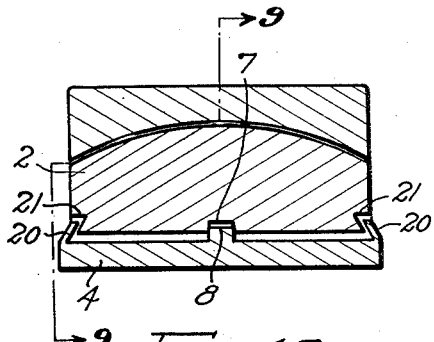
Fig. 10 is a section taken on the line 10—10 of Fig. 9.

In the form shown in Figs. 9 and 10, the inner bearing member 4 is provided at its sides with peripheral tongues or flanges 20 which are adapted to engage the side walls of undercut recesses 21 formed in the side walls of the bearing blocks.

In this connection it may be pointed out that the side wall recesses 21 facilitate the manufacture of the bearing blocks as disclosed in copending application of August Gunnar Wallgren, Serial No. 387,781, filed August 22, 1929.

Flanges 20, like the tongues previously described, are made axially resilient so that the blocks may be sprung into position with the flanges extending into the recesses to limit free radial movement of the blocks.

Since ring 4 is hardened, it must be subjected to suitable annealing and tempering operations in order to secure the necessary resiliency in the flanges or tongues. Such procedure is well known to those skilled in the art, and it will be evident that, due to the small section of the flanges and tongues, the ring member as a whole may be heat-treated to give the desired resiliency to the flanges and tongues without sacrificing the desired hardness of the parts of the ring surface forming bearing areas for the blocks.

With respect to the hereinbefore described embodiments of the invention, it will be observed that means associated with the inner bearing member are provided, which means permit the amount of radial play in the blocks necessary for them to assume their tilted position, but which means at the same time, prevents disassembly of the blocks with respect to the bearing member with which they are adapted to rotate. Furthermore the resilient means provided for holding the blocks in their proper positions permits ready assembly of the blocks and the bearing member with which they rotate into a sub-unit from which individual blocks may be removed without resorting to the use of tools.

Figure 11:
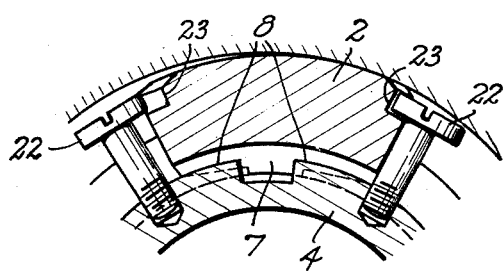
Fig. 11 is a section taken on the line 11—11 of Fig. 12 and showing a fifth form of the invention.
Figure 12:
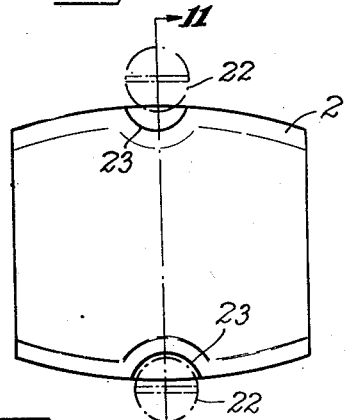
Fig. 12 is a plan view of the block shown in Fig. 11.

Referring to Figs. 11 and 12, a form of the invention is illustrated in which radially projecting studs 22 are secured to the inner bearing member 4, the heads of these studs cooperating with the retaining surface formed by the recesses 23 in the bearing blocks to limit the outward radial movement of the blocks. In this form, the blocks are preferably guided axially by means of grooves 7 and projections 8 and are retained against peripheral movement by the abutment of the ends of the blocks against the studs 22.

In the several embodiments hereinbefore described, the bearing is shown as a separate unit comprising an inner ring and an outer race. The invention has further been illustrated in connection with a bearing unit of the self-aligning type and particularly with respect to this type of unit the invention possesses the advantage that the limiting of the radial play of the blocks prevents the blocks from falling out of position when the inner ring is turned at such an angle with respect to the outer race that some of the blocks are completely out of contact with the outer race.

It is to be understood, however, that the invention is not limited to separate bearing units, since the several projections serving to hold the blocks in position may be formed directly upon a shaft which thus becomes the inner bearing member. Similarly, in some instances, the spherical bearing surface 6 may be formed directly in a casing which is thereby made to form the outer bearing member.

From the preceding description it will be obvious that the invention may be embodied in many different forms of apparatus, and may be modified in many respects without departing from the scope thereof. It will further be evident that the invention is applicable to forms of bearings other than the reversible type in connection with which it has been illustrated.

What we claim is:

1. A bearing of the radial type comprising an inner member, an outer member, a plurality of bearing blocks having operative positions radially between said members, said blocks having undercut recesses therein, and projections on said inner member bifurcated to form radially extending tongues projecting into said recesses, said tongues being adapted to engage the side walls of the recesses to limit free radial movement of said blocks outwardly from said inner member.

2. A bearing of the radial type comprising an inner member, an outer member, a plurality of bearing blocks having operative positions radially between said members, said blocks having undercut recesses therein, and radial projections on the inner member bifurcated to form axially resilient radially extending tongues projecting into said recesses to limit free radial movement of said blocks outwardly from said inner member.

3. A bearing of the radial type comprising an inner member, an outer member, a plurality of bearing blocks having operative positions radially between said members, said blocks having undercut recesses therein, and radial projections on the inner member bifurcated to form axially resilient radially extending tongues projecting into said recesses to limit free radial movement of said blocks outwardly from said inner member, the normal axial extent of said tongues being greater than the least width of said recesses whereby said tongues are resiliently held within the recesses.

4. A bearing of the radial type comprising an inner member, an outer member and a plurality of bearing blocks having operative positions radially between said members, said inner member having projections circumferentially bifurcated to form radially extending tongues and said blocks having undercut recesses receiving said tongues and providing surfaces cooperating therewith to limit free radial movement of said blocks outwardly from said inner member.

5. A bearing of the radial type comprising an inner member, an outer member and a plurality of bearing blocks having operative positions radially between said members, said blocks having circumferentially extending undercut grooves extending from end to end thereof, and said inner member comprising parts projecting into said grooves and adapted to engage the side walls thereof to limit free radial movement of the blocks outwardly from said inner member.

6. A bearing of the radial type comprising an inner member; an outer member; a plurality of bearing blocks having operative positions radially between said members, said blocks having circumferentially extending undercut grooves extending from end to end thereof; and projections on said inner member, said projections forming tongues extending into said grooves for limiting free radial movement of the blocks outwardly from said inner member and abutments for limiting peripheral movement of the blocks with respect to the inner member.

7. A bearing of the radial type comprising an inner member; an outer member; a plurality of bearing blocks having operative positions radially between said members, said blocks having circumferentially extending undercut grooves extending from end to end thereof; and projections on the inner member comprising tongues extending into the said grooves for limiting free radial movement of the blocks outwardly from said inner member and lugs extending axially on either side of said grooves, said lugs forming abutments for limiting peripheral movement of the blocks with respect to the inner member.

8. A bearing of the radial type comprising an inner member, an outer member, a plurality of bearing blocks having operative positions radially between said members, said blocks having circumferentially extending undercut grooves extending from end to end thereof, circumferentially extending tongues on the inner member, said tongues projecting into said grooves for limiting free radial movement of the blocks outwardly from said inner member, and separate radially extending projections on the inner member forming abutments for limiting the circumferential movement of the blocks with respect to the inner member.

9. A bearing of the radial type comprising an inner member, an outer member, a plurality of bearing blocks adapted to rotate with said inner member and having operative positions radially between said members, said blocks having retaining surfaces, and radially extending studs on said inner member adapted to engage said surfaces to limit free outward radial movement of the blocks due to movement thereof with the inner member.

10. A bearing of the radial type comprising an inner member, an outer member, a plurality of bearing blocks adapted to rotate with said inner member and having operative positions radially between said members, said blocks having retaining surfaces, and radially extending studs on said inner member adapted to engage said surfaces to limit free outward radial movement of the blocks due to movement thereof with the inner member, said studs also forming abutments for limiting circumferential movement of the blocks with respect to the inner member.

11. A bearing of the radial type comprising an inner member, an outer member and a plurality of bearing blocks adapted to rotate with said inner member and having operative positions radially between said members, said blocks having retaining surfaces and said inner member comprising parts adapted to engage said surfaces to limit free outward radial movement of the blocks due to movement thereof with the inner member, said surface and said parts also forming means for guiding said blocks axially.

12. A self-aligning radial bearing comprising an inner bearing ring, an outer race having a spherically curved inner bearing surface, and a plurality of bearing blocks adapted to rotate with said inner ring and having operative positions radially between the ring and the race, said ring and said blocks having cooperating surfaces arranged to permit and to limit free radial movement of the blocks outwardly with respect to the ring due to movement of the blocks with the ring.

13. A self-aligning radial bearing comprising an inner bearing ring, an outer race having a spherically curved inner bearing surface, a plurality of bearing blocks having operative positions radially between the ring and the race, said blocks having circumferentially extending undercut recesses in their inner faces, and radial projections on said ring forming tongues projecting into said recesses for limiting free radial movement of the blocks outwardly with respect to the ring and for axially guiding the blocks.

14. A self-aligning radial bearing comprising an inner bearing ring, an outer race having a spherically curved inner bearing surface, and a plurality of bearing blocks adapted to rotate with said inner ring having operative positions radially between the ring and the race, said blocks having dovetail grooves in their inner faces and said ring having radially extending resilient parts adapted to engage the said walls of said recesses to limit free radial movement of the blocks outwardly with respect to the ring.

15. A bearing of the radial type comprising an inner member, an outer member, a plurality of bearing blocks having operative positions radially between said members, said blocks having dovetail grooves therein, and means comprising axially resilient radially extending tongues projecting into said grooves to limit free radial movement of said blocks outwardly from said inner member.

16. A bearing of the radial type comprising an inner member, an outer member, a plurality of bearing blocks having operative positions radially between said members, said blocks having dovetail grooves therein, and means comprising radially extending tongues adapted to rotate with said inner member and projecting into said grooves for limiting free radial movement of said blocks outwardly with respect to said inner member.

17. A bearing of the radial type comprising an inner member, an outer member, a plurality of bearing blocks having operative positions radially between said members, said blocks having dovetail grooves therein, and means comprising axially resilient radially extending tongues adapted to rotate with said inner member and projecting into said grooves for limiting free radial movement of said blocks outwardly with respect to said inner member.

18. A bearing of the radial type comprising an inner member, an outer member and a plurality of bearing blocks having operative positions radially between said members, said blocks having circumferentially extending dovetail grooves extending from end to end thereof, and means providing radially extending tongues projecting into said grooves for limiting free radial movement of said blocks outwardly with respect to said inner member.

19. A bearing of the radial type comprising an inner member, an outer member and a plurality of bearing blocks having operative positions radially between said members, said blocks having circumferentially extending dovetail grooves extending from end to end thereof, and means comprising axially resilient radially extending tongues projecting into said grooves for limiting free radial movement of said blocks outwardly with respect to said inner member.

20. A self-aligning radial bearing unit comprising an inner bearing ring, an outer race having a spherically curved inner bearing surface, a plurality of bearing blocks having operative positions radially between the ring and the race, said blocks having circumferentially extending dovetail grooves in their inner faces, and means comprising axially resilient radially extending tongues projecting into said grooves for limiting free radial movement of the blocks outwardly with respect to the ring.

21. In a self-aligning radial bearing, a bearing block having a spherically curved outer face and a circumferentially extending dovetail groove in its inner face, an outer race having a spherically curved inner bearing surface adapted to slide with respect to said block, an inner bearing ring, and means adapted to engage the side walls of said groove for limiting free radial movement of the block outwardly with respect to the inner member.

21. In a self-aligning radial bearing, a bearing block having a spherically curved outer face and a circumferentially extending dovetail groove in its inner face, an outer race having a spherically curved inner bearing surface adapted to slide with respect to said block, an inner bearing ring, and axially resilient means adapted to engage the side walls of said groove for limiting free radial movement of the block outwardly with respect to the ring.

23. A block element for self-aligning radial bearings having a spherically curved outer face and a circumferentially extending dovetail groove in its inner face, said groove providing undercut sides adapted to engage radially projecting bearing parts for holding the block in assembled position in a bearing.

24. A block element for self-aligning radial bearings having a spherically curved outer face and a dovetail groove in its inner face extending circumferentially from end to end of the block, said groove providing undercut sides adapted to engage radially extending axially resilient bearing parts for holding the block in assembled position in a bearing.

25. A bearing of the rotary type comprising spaced bearing members and a plurality of bearing blocks having operative positions between said members, each of said blocks having one major face providing bearing surface in sliding relation with respect to one of said bearing members and an opposite major face having a peripherally extending groove therein providing undercut surfaces, and resilient bearing parts projecting into said grooves and engaging said undercut surfaces to hold the blocks in assembled relation with respect to the other of said bearing members.

26. A bearing of the rotary type comprising spaced bearing members and a plurality of bearing blocks having operative positions between said members, each of said blocks having one major face providing bearing surface in sliding relation with respect to one of said bearing members and an opposite major face having recesses at the ends of the block providing undercut surfaces, and bearing parts projecting into said recesses and engaging said undercut surfaces to hold the blocks in assembled relation with respect to the other of said bearing members.

27. A block element for rotary bearings having one major face providing a surface adapted to slide with respect to a cooperating bearing member and a second major face opposite said one major face having a peripherally extending groove providing undercut surfaces adapted to engage resilient projecting bearing parts for holding the block in assembled position with respect to a second bearing member.

28. A block element for rotary bearings having one major face providing a surface adapted to slide with respect to a cooperating bearing member and a second major face opposite said one major face having recesses at opposite ends of the block providing undercut surfaces adapted to engage projecting bearing parts for holding the block in assembled position with respect to a second bearing member.

In testimony whereof we have affixed our signatures.

AUGUST GUNNAR FERDINAND WALLGREN.
CARL GUSTAF JANSON.